United States Patent
Steagall et al.

(10) Patent No.: US 11,433,577 B2
(45) Date of Patent: Sep. 6, 2022

(54) NON-WOVEN FABRIC WITH METALLIC PRINT PATTERN FOR USE IN FOAM MOLDING APPLICATIONS

(71) Applicants: Darrell Patrick Steagall, Charlotte, NC (US); Steven L. Sommers, Coral Gables, FL (US)

(72) Inventors: Darrell Patrick Steagall, Charlotte, NC (US); Steven L. Sommers, Coral Gables, FL (US)

( * ) Notice: Subject to any disclaimer, the term of this patent is extended or adjusted under 35 U.S.C. 154(b) by 201 days.

(21) Appl. No.: 16/232,266

(22) Filed: Dec. 26, 2018

(65) Prior Publication Data

US 2019/0202093 A1 Jul. 4, 2019

Related U.S. Application Data

(60) Provisional application No. 62/611,101, filed on Dec. 28, 2017.

(51) Int. Cl.

| | |
|---|---|
| B29C 44/14 | (2006.01) |
| D06M 11/83 | (2006.01) |
| B29C 44/12 | (2006.01) |
| B29C 33/16 | (2006.01) |
| D04H 3/011 | (2012.01) |
| D04H 3/007 | (2012.01) |
| B32B 5/24 | (2006.01) |
| B32B 5/02 | (2006.01) |

(Continued)

(52) U.S. Cl.
CPC ............ *B29C 44/143* (2013.01); *B29C 33/16* (2013.01); *B29C 44/1219* (2013.01); *B32B 5/022* (2013.01); *B32B 5/245* (2013.01); *D04H 1/413* (2013.01); *D04H 1/66* (2013.01); *D04H 3/007* (2013.01); *D04H 3/011* (2013.01); *D04H 18/02* (2013.01); *D06H 7/02* (2013.01); *D06M 11/83* (2013.01); *B29K 2105/0854* (2013.01); *B29K 2623/12* (2013.01); *B29K 2667/00* (2013.01); *B29L 2031/58* (2013.01); *B32B 2250/02* (2013.01); *B32B 2255/02* (2013.01); *B32B 2255/205* (2013.01); *B32B 2262/0253* (2013.01); *B32B 2262/0276* (2013.01); *D06M 2101/20* (2013.01); *D06M 2101/32* (2013.01); *D10B 2321/022* (2013.01); *D10B 2331/04* (2013.01); *D10B 2505/08* (2013.01); *D10B 2505/12* (2013.01)

(58) Field of Classification Search
CPC .............................. B29C 44/143; B29C 33/16
See application file for complete search history.

(56) References Cited

U.S. PATENT DOCUMENTS

2007/0267771 A1* 11/2007 Earnest ............... B29C 44/1271
264/46.4

* cited by examiner

*Primary Examiner* — Niki Bakhtiari
*Assistant Examiner* — John J DeRusso
(74) *Attorney, Agent, or Firm* — Moore & Van Allen PLLC; W. K Kevin Ransom

(57) ABSTRACT

Provided is a fabric for producing a foam part, comprising: a non-woven fabric sheet comprising: a first metallic pattern printed on a first surface of the non-woven fabric sheet; wherein the first metallic pattern comprises a plurality of pattern elements having a predetermined optimal distance therebetween; wherein the metallic pattern comprises a print paste and a metallic powder; wherein the non-woven fabric sheet is structured to be positioned in a mold for producing the foam part such that the first metallic pattern of the non-woven fabric sheet is operatively coupled with a magnet element of a first mold half of the mold.

6 Claims, 10 Drawing Sheets

(51) Int. Cl.
  *D06H 7/02*      (2006.01)
  *D04H 1/66*      (2012.01)
  *D04H 1/413*     (2012.01)
  *D04H 18/02*     (2012.01)
  *D06M 101/32*        (2006.01)
  *D06M 101/20*        (2006.01)
  *B29L 31/58*         (2006.01)
  *B29K 623/00*        (2006.01)
  *B29K 667/00*        (2006.01)
  *B29K 105/08*        (2006.01)

500

| YOUR COMPANY NAME YOUR COMPANY NAME YOUR C |
| BRAND NAME PART NUMBER BRAND NAME PART NUM |
| YOUR COMPANY NAME YOUR COMPANY NAME YOUR C |
| BRAND NAME PART NUMBER BRAND NAME PART NUM |
| YOUR COMPANY NAME YOUR COMPANY NAME YOUR C |
| BRAND NAME PART NUMBER BRAND NAME PART NUM |
| YOUR COMPANY NAME YOUR COMPANY NAME YOUR C |
| BRAND NAME PART NUMBER BRAND NAME PART NUM |
| YOUR COMPANY NAME YOUR COMPANY NAME YOUR C |
| BRAND NAME PART NUMBER BRAND NAME PART NUM |
| YOUR COMPANY NAME YOUR COMPANY NAME YOUR C |
| BRAND NAME PART NUMBER BRAND NAME PART NUM |
| YOUR COMPANY NAME YOUR COMPANY NAME YOUR C |
| BRAND NAME PART NUMBER BRAND NAME PART NUM |
| YOUR COMPANY NAME YOUR COMPANY NAME YOUR C |
| BRAND NAME PART NUMBER BRAND NAME PART NUM |
| YOUR COMPANY NAME YOUR COMPANY NAME YOUR C |
| BRAND NAME PART NUMBER BRAND NAME PART NUM |
| YOUR COMPANY NAME YOUR COMPANY NAME YOUR C |
| BRAND NAME PART NUMBER BRAND NAME PART NUM |
| YOUR COMPANY NAME YOUR COMPANY NAME YOUR C |

FIGURE 5

NON-WOVEN FABRIC WITH METALLIC PRINT PATTERN FOR USE IN FOAM MOLDING APPLICATIONS

CROSS-REFERENCE RELATED APPLICATIONS

This application is a non-provisional of and claims priority to U.S. Provisional Application No. 62/611,101 filed on Dec. 28, 2017, of the same title, the contents of which are also incorporated herein by reference.

FIELD OF THE INVENTION

The present invention generally relates to systems and methods for foam molding. In particular, certain embodiments of the present invention relate to foam molding applications which may involve molds with a fabric substrate or the like, held in place inside the mold, during manufacture.

BACKGROUND

Manufacturers making conventional foam parts for automotive seats typically need to bond various non-woven fabrics or composites to the foam to enhance its properties such as strength, rigidity, noise abatement, and the like. This is typically accomplished by attaching a fabric pattern (backing sheet) to the interior of the foam mold before filling the mold with foam. The backing sheet is typically attached to the top side of the mold, and it must stay attached, so that it does not fall out of place before the foam is poured in and the mold is closed. This process is labor intensive, time consuming and expensive. There is a need for improved apparatuses and methods for constructing and batch-processing of fabric for attaching to a mold.

SUMMARY OF THE INVENTION

The present invention provides a fabric for producing a foam part, comprising:
a non-woven fabric sheet comprising:
a first metallic pattern printed on a first surface of the non-woven fabric sheet;
wherein the first metallic pattern comprises a plurality of pattern elements having a predetermined optimal distance therebetween;
wherein the metallic pattern comprises a print paste and a metallic powder;
wherein the non-woven fabric sheet is structured to be positioned in a mold for producing the foam part such that the first metallic pattern of the non-woven fabric sheet is operatively coupled with a magnet element of a first mold half of the mold.

In one embodiment, the non-woven fabric sheet further comprises a second metallic pattern printed on a second surface of the non-woven fabric sheet, opposite the first surface.

In one embodiment, the first metallic pattern is printed on a continuous roll of fabric, and wherein the continuous roll of fabric is cut to form the non-woven fabric sheet.

The present invention also provides a fabric for producing a foam part, comprising:
a composite fabric sheet comprising:
a first metallic pattern printed on a first inner layer of the composite fabric sheet;
wherein the first metallic pattern comprises a plurality of pattern elements having a predetermined optimal distance therebetween;
wherein the metallic pattern comprises a print paste and a metallic powder;
wherein the composite fabric sheet is structured to be positioned in a mold for producing the foam part such that the metallic pattern of the composite fabric sheet is operatively coupled with a magnet element of a first mold half of the mold.

The present invention also provides an apparatus for producing a foam part, comprising:
a mold for producing a foam part, the mold comprising a first mold half and a second mold half defining a volume therebetween, wherein the mold comprises a magnet element affixed to a surface of the first mold half facing the second mold half; and
a fabric sheet comprising a first metallic pattern printed on a first surface of the fabric sheet, wherein the first metallic pattern comprises a plurality of pattern elements having a predetermined optimal distance therebetween, wherein the first metallic pattern comprises a print paste and a metallic powder;
wherein the fabric sheet is positioned in the mold such that the first metallic pattern of the fabric sheet is coupled with the magnet element of the mold.

The present invention also provides a method for producing a foam part, comprising:
providing a mold for producing a foam part, the mold comprising a first mold half and a second mold half defining a volume therebetween, wherein the mold comprises a magnet element affixed to a surface of the first mold half facing the second mold half;
providing a continuous roll of fabric;
printing a first metallic pattern on a first surface of the continuous roll of fabric, wherein the first metallic pattern comprises a plurality of pattern elements having a predetermined optimal distance therebetween, wherein the first metallic pattern comprises a print paste and a metallic powder;
cutting the continuous roll of fabric to form a fabric sheet, wherein the fabric sheet comprises the first metallic pattern; and
affixing the fabric sheet in the mold such that the first metallic pattern of the fabric sheet is coupled with the magnet element of the mold.

BRIEF DESCRIPTION OF THE DRAWINGS

The non-woven fabric with metallic print pattern of the present invention alleviates the forgoing deficiencies of conventional methods and also provides additional advantages. The advantages and features of the invention, and the manner in which the same are accomplished, will become more readily apparent upon consideration of the following detail description of the invention taken in conjunction with the accompanying drawings, which illustrate preferred and exemplary embodiments and which are not necessarily drawn to scale, wherein:

FIG. 5 illustrates a view 500 of pattern elements printed on a fabric, in accordance with one embodiment of the invention;

DETAILED DESCRIPTION OF THE INVENTION

The present invention now will be described more fully hereinafter with reference to the accompanying drawings, in which some, but not all embodiments of the invention are shown. This invention may be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 9:
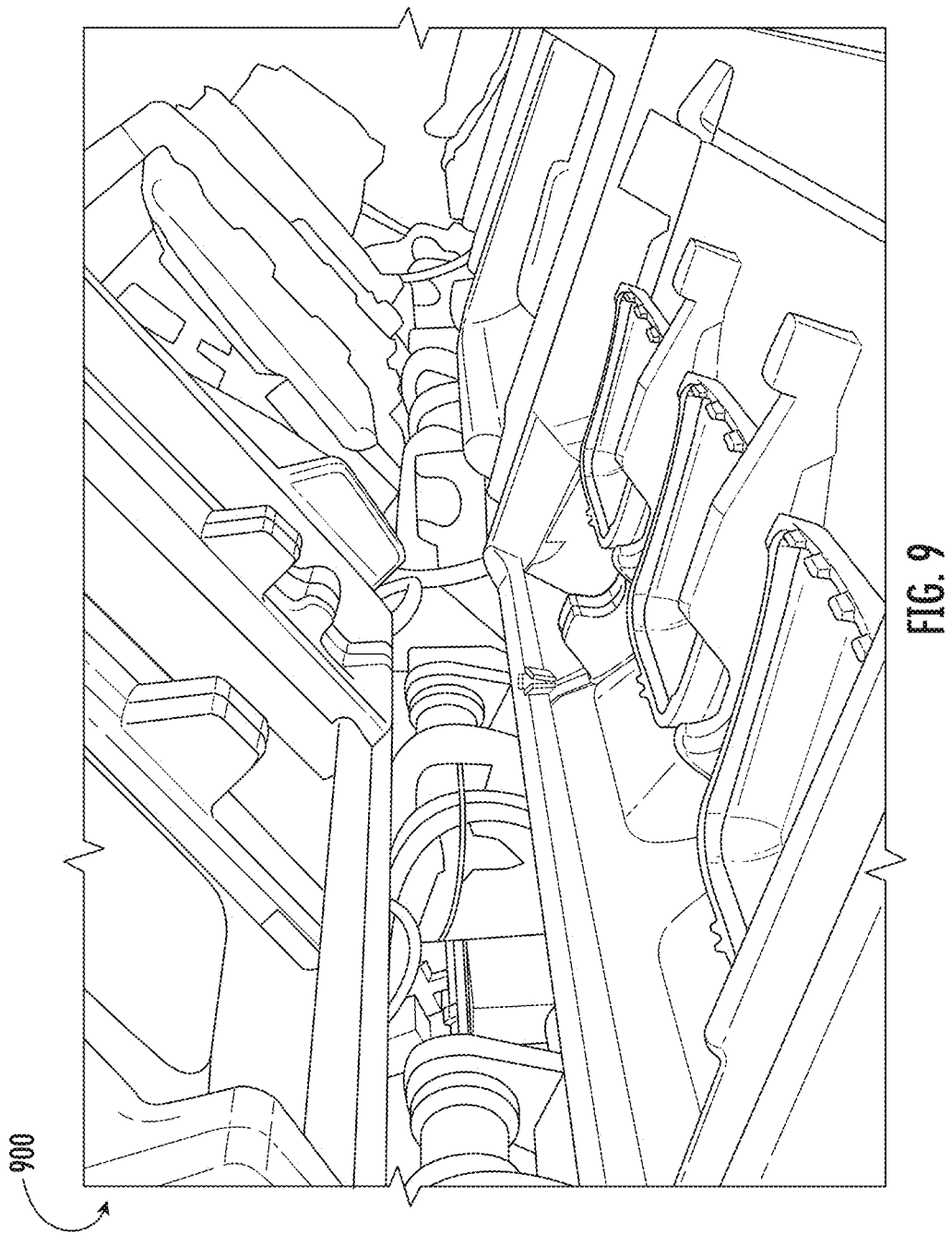
FIG. 9 illustrates a conventional foam mold for automotive seats.
Figure 10:
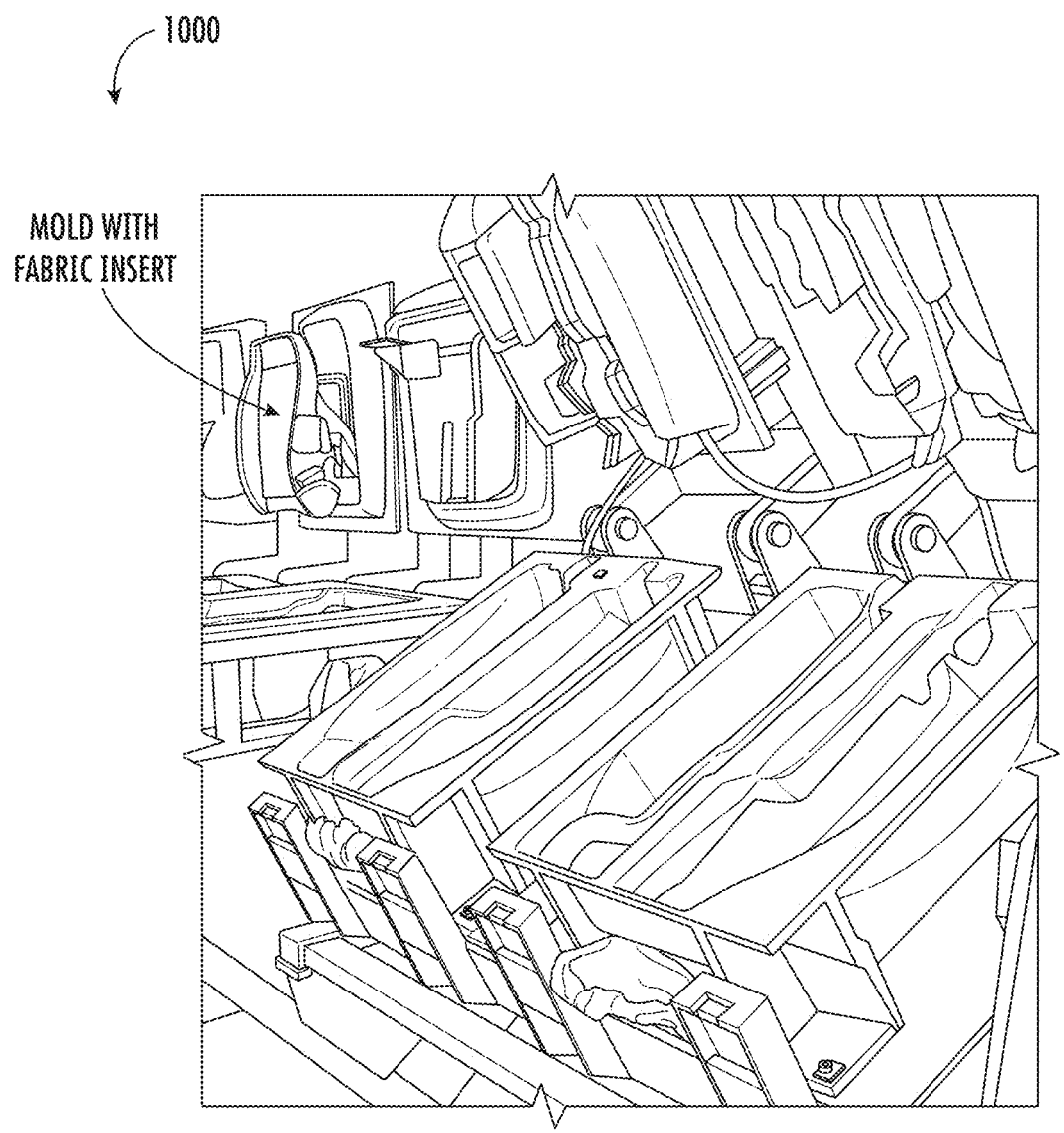
FIG. 10 illustrates another conventional foam mold assembly for automotive seats, including a fabric insert placed on a mold.

As alluded to previously, manufacturers making foam parts for automotive seats often need to bond various nonwoven fabrics or composites to the foam to enhance its properties such as strength, rigidity, noise abatement, and the like. This is typically accomplished by attaching a fabric pattern (backing sheet) to the interior of the foam mold before filling the mold with foam. The backing sheet is typically attached to the top side of the mold, and it must stay attached, so that it does not fall out of place before the foam is poured in and the mold is closed. The providers of the fabric sheets strategically place metal staples, stickers, or printed metallic dots on the fabric sheet to allow it to stick to the magnets. For attaching the fabric sheets, molders or operators typically place magnets in the molds so that they match the attachments (e.g., staples) on the fabric sheet. This process is labor intensive, time consuming and expensive, as will be described in detail below. FIGS. 9 and 10 illustrates examples of conventional foam molds typically employed for automotive seats. FIG. 9 illustrates a clam shell molds without attached fabric sheets and FIG. 10 illustrates a clamshell mold with an attached fabric sheet. The fabric sheets described above would be typically attached to the top half of the mold (e.g., a clamshell mold), as illustrated by FIG. 10. U.S. Patent Application Publication No. 2007/0267771A1, and U.S. Patent Application Publication No. 2009/0277566A1, generally relate to the foregoing methods.

Conventional methods for producing foam parts described above, have the following disadvantages. The magnets in the molds and dots/staples on the fabric sheet must be strategically placed to properly hold the fabric against the complex contours of the mold. The process of applying the dots or staples to the fabric sheet is labor intensive, time consuming and expensive. Furthermore, the process of placing magnets in the molds so that they match the attachments (e.g., staples) on the fabric sheet, is also cumbersome, because, if dots/staples are not perfectly placed on the fabric sheet, in the same exact configuration as the magnets in the mold, and the fabric sheet is not placed carefully in the mold to align the dots and magnets, the part will not stay positioned properly in the mold, causing defective parts and excess scrapped material. Moreover, as automotive seats become increasingly complex, more and more dots are required, hence, increasing both the expense and time required, and the chances of error.

Some conventional methods (such as those employed by Velcro Group (Velcro US, VelcroMex, etc.) and Petralex) generally relate to screen printing metallic dots onto the fabric parts using a print paste loaded with iron fines or dust. Other conventional methods may utilize some form of printed dots. These methods do not alleviate the deficiencies and concerns regarding conventional methods listed above, although they may, at best, reduce labor costs, in some instances.

Moreover, other conventional methods relate to applying metalized dot stickers or staples at precise locations on the fabric sheet, corresponding with the locations of the magnets in the mold. This method is less cost effective due to the labor involved, and has a higher chance of error (e.g., dots or staples may be placed in the wrong locations).

Although the processing methods and costs may vary, the above conventional solutions rely on precise placement of metallic dots or staples on the fabric sheet to both affix the sheet to the mold, so it does not dislocate or fall off, and to precisely align the sheet in the mold. This precision and the fact that even with automated application, dots must be applied to one sheet at a time, leads to unnecessarily high processing costs.

The novel solution of the present invention, as will be described in detail below, overcomes the foregoing disadvantages of conventional methods and also provides other advantages, as will be described below in detail. The present invention eliminates the need to process sheets individually by printing a pattern on the fabric in continuous roll form before cutting it into the sheets. Here, for printing the pattern on the fabric, the present invention employs a metalized print paste on a suitable fabric in a pattern of parallel lines, diamond, grid, waves, circles, text, or any other suitable pattern. In some embodiments, pattern elements are spaced with a predetermined optimal distance between the pattern elements, such that the pattern elements are close enough to provide positive engagement with the magnets in the mold. Although, this predetermined optimal distance or spacing can vary among embodiments, for example, the predetermined optimal distance or spacing may be between 5-15 mm, in some embodiments. This provides an even distribution of metal material over the entire surface of the fabric that has enough coverage to engage the magnets in the mold regardless of their location, but leaves enough open, uncoated space to reduce cost and lessen the effect on the hand (feel) of the fabric. Moreover, although automotive foam molding is used as an example, the present invention is applicable to any molded foam product that may require a fabric substrate to be held in place inside the mold.

FIGS. 1-8 illustrate various embodiments of the invention directed to non-woven fabric with metallic print pattern for use in foam molding applications. As discussed previously, embodiments of the present invention involve printing a pattern on the fabric in continuous roll form before cutting it into the sheets. Here, for printing the pattern on the fabric, embodiments of the present invention employ a metalized print paste on a suitable fabric in a pattern of parallel lines, diamond, grid, waves, circles, text, or any other suitable pattern. In some embodiments, the printing is accomplished via screen printing, flexographic printing and/or another suitable method.

In some embodiments, pattern elements are spaced with a predetermined optimal distance between the pattern elements, such that the pattern elements are close enough to provide positive engagement with the magnets in the mold. Although, this predetermined optimal distance or spacing can vary among embodiments, for example, the predetermined optimal distance or spacing may be between 5-15 mm, in some embodiments. This provides an even distribution of metal material over the entire surface of the fabric that has enough coverage to engage the magnets in the mold regardless of their location, but leaves enough open, uncoated space to reduce cost and lessen the effect on the hand (feel) of the fabric. In some embodiments, the predetermined optimal distance or spacing may be between 5-15 mm, 5-10 mm, 10-15 mm, 0-15 mm, 5-15 mm, 0-20 mm, 0-5 mm, 0-10 mm, 5-20 mm, 0-25 mm, 10-25 mm, 15-25 mm, and/or overlapping, in between, or outside these ranges. FIGS. 1-5 illustrate examples of the pattern elements in accordance with various embodiments of the invention as described below.

Figure 1:
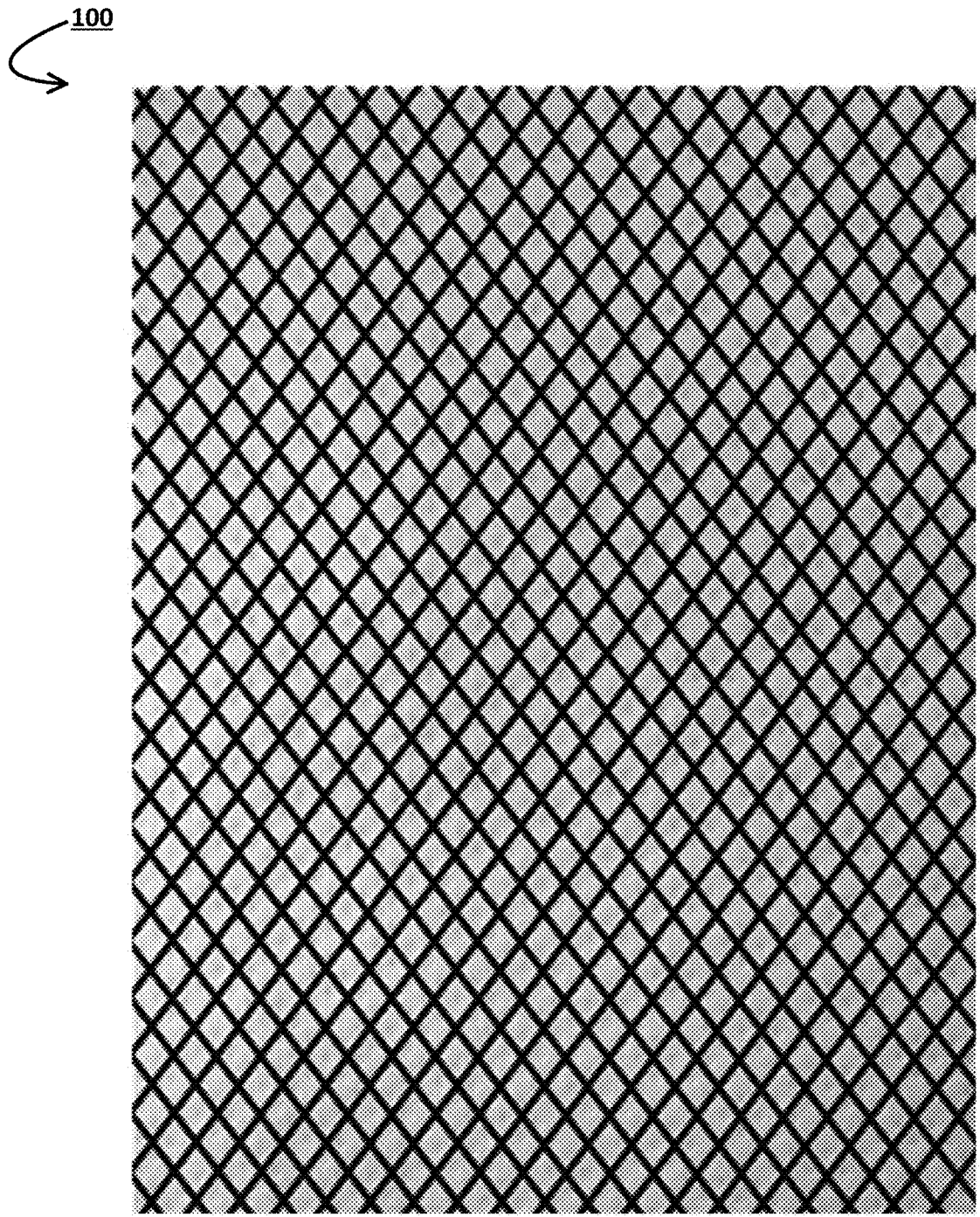
FIG. 1 illustrates a view 100 of pattern elements printed on a fabric, in accordance with one embodiment of the invention.
Figure 2:
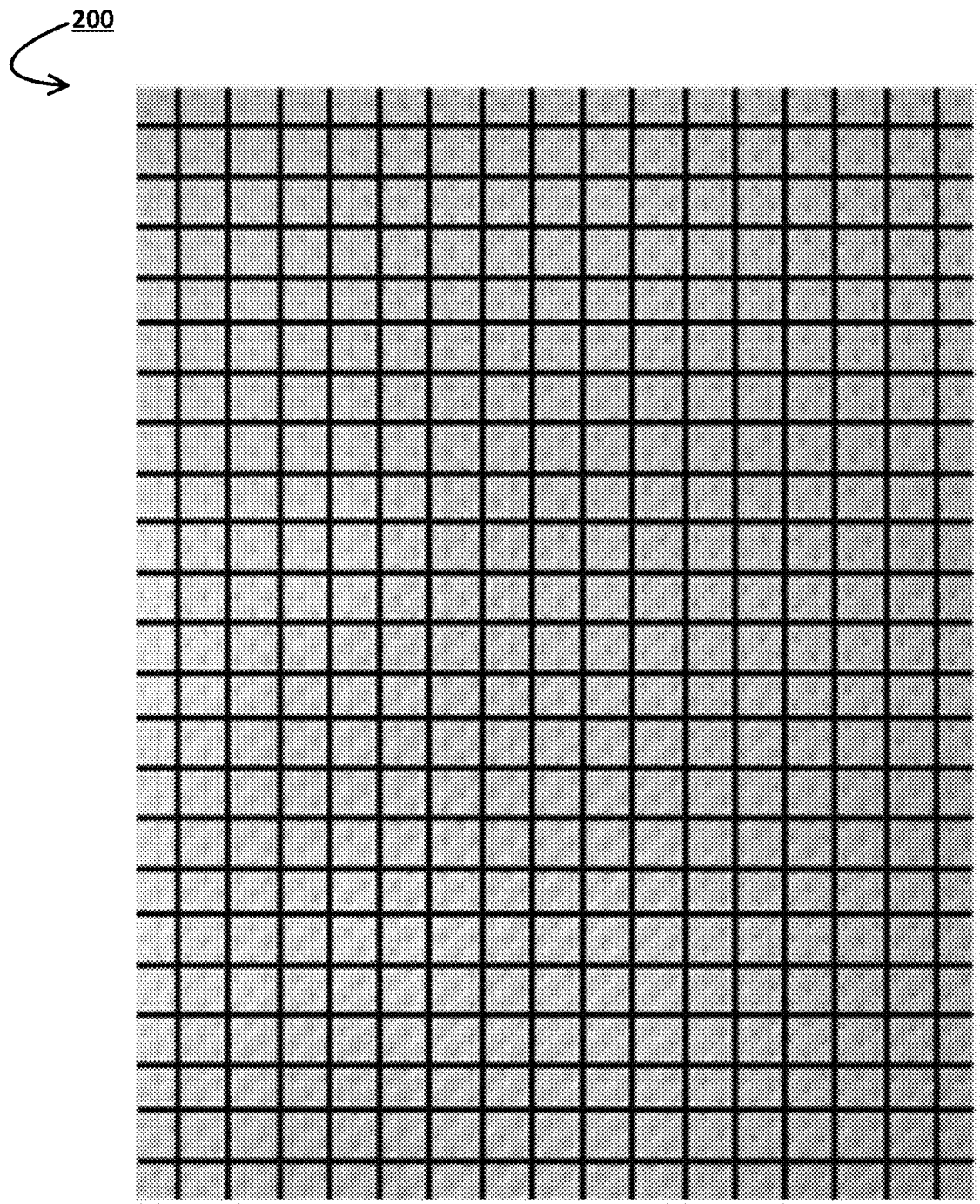
FIG. 2 illustrates a view 200 of pattern elements printed on a fabric, in accordance with one embodiment of the invention.
Figure 3:
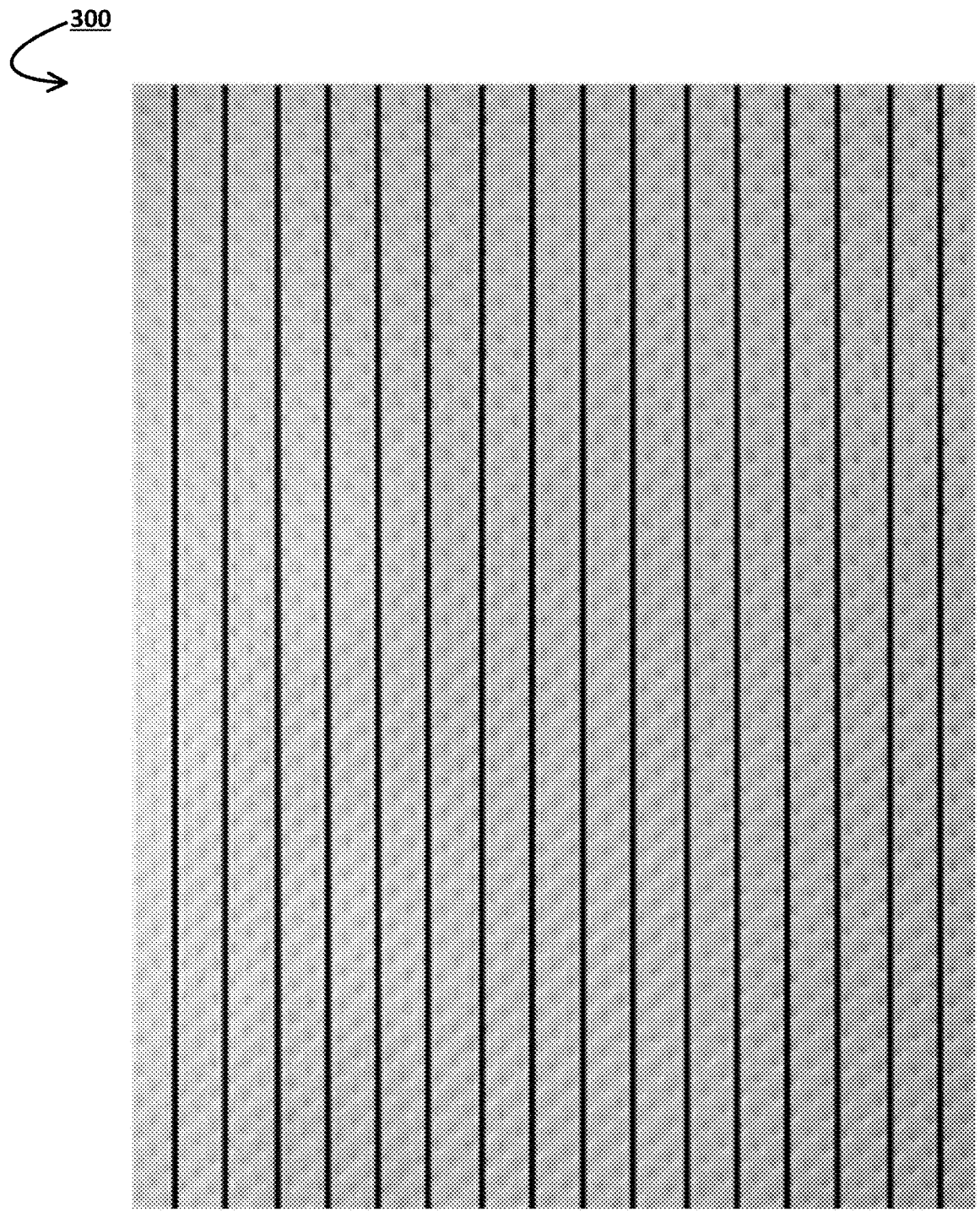
FIG. 3 illustrates a view 300 of pattern elements printed on a fabric, in accordance with one embodiment of the invention.
Figure 4:
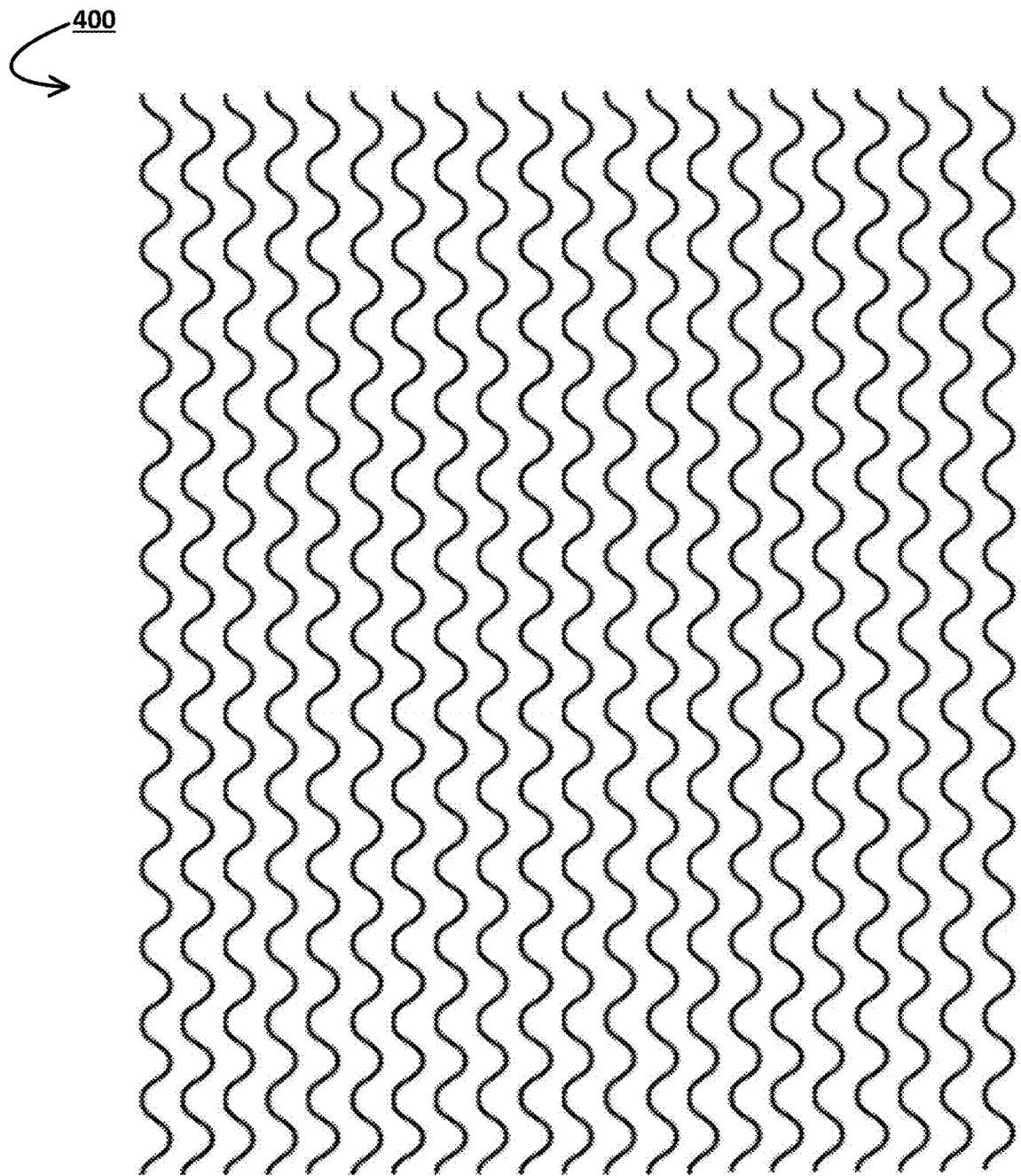
FIG. 4 illustrates a view 400 of pattern elements printed on a fabric, in accordance with one embodiment of the invention.

The printed pattern described above may be on one or both surfaces of the fabric. In embodiments utilizing a composite fabric, the printed pattern may be between layers so that it is hidden from view. FIG. 1 illustrates a view 100 of pattern elements printed on a fabric in a diamond or intersecting diagonal lines pattern, in accordance with one embodiment of the invention. The lines in the pattern 100 may be spaced apart by a first predetermined optimal distance or spacing. FIG. 2 illustrates a view 200 of pattern elements printed on a fabric in a grid pattern, in accordance with one embodiment of the invention. FIG. 3 illustrates a view 300 of pattern elements printed on a fabric in a parallel-lines pattern, in accordance with one embodiment of the invention. FIG. 4 illustrates a view 400 of pattern elements printed on a fabric in a waves or curvilinear pattern, in accordance with one embodiment of the invention. FIG. 5 illustrates a view 500 of pattern elements printed on a fabric in a text pattern, in accordance with one embodiment of the invention. In particular, FIG. 5 illustrates lines of text (e.g., comprising repetitive or non-repetitive words, symbols or alphanumeric characters, etc.) printed on a fabric that are spaced apart by a second predetermined optimal distance or spacing. Although, FIG. 5 illustrates text comprising "company name", "brand name", "part number" and the like, it is understood that any suitable text, in an optimal size and font may be employed. In some embodiments, the views 100-500 may refer to a planar view (e.g., top view) of the one of the surfaces of the printed fabric, from a suitable distance, at a suitable magnification, enlargement or reduction. In some embodiments, the views 100-500 may refer to a planar sectional view of a planar section of the printed fabric, such as a composite fabric, from a suitable distance, at a suitable magnification, enlargement or reduction. In some embodiments, only one side of the fabric is printed with pattern elements, such as those illustrated by FIGS. 1-5, individually or in combination. In some embodiments, both sides of the fabric are printed with same or different pattern elements, such as those illustrated by FIGS. 1-5, individually or in combination.

Figure 6:
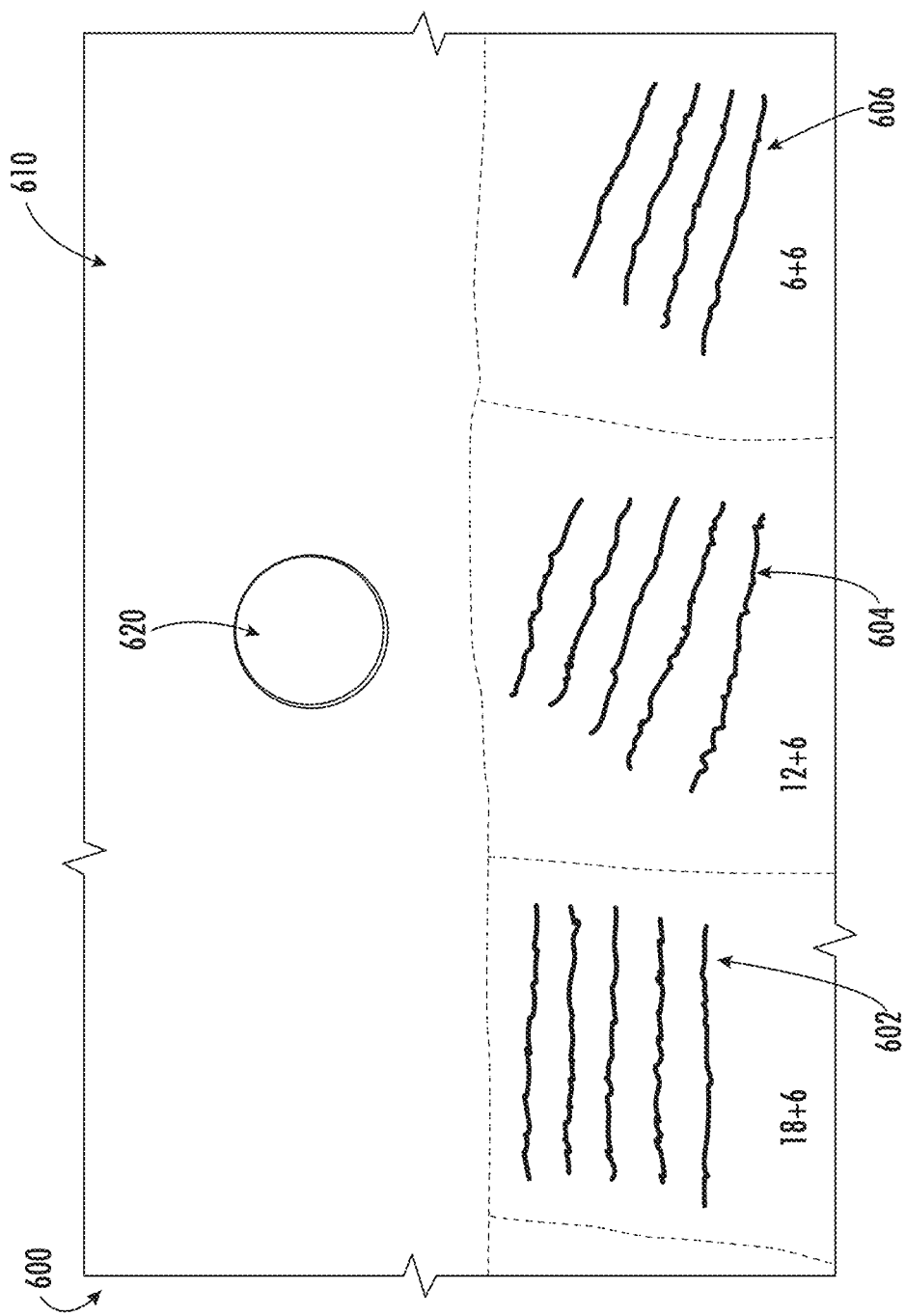
FIG. 6 illustrates various types of print paste and ratios thereof, in accordance with some embodiments of the invention.

As such, various ratios and types of print paste and metallic powders can be employed to print the pattern elements of the fabric. FIG. 6 illustrates various types of print paste and ratios thereof, in accordance with some embodiments of the invention. In particular, FIG. 6 illustrates a photo of a small-scale sample of the various ratios of printed patterns (602, 604, 606) printed on a fabric sheet 610. Specifically, printed patterns with ratios of 1:1 (pattern 606), 2:1 (pattern 604), and 3:1 (pattern 602) by weight of $FE_2O_4$ and a silk screen pigment (e.g., a generic silk screen pigment) are illustrated herein. FIG. 6 also illustrates a silver magnet 620, which is typical of the magnets used in the molds. In some instances, patterns 602-606 have a spacing of 5 mm between line pattern elements.

Figure 7:
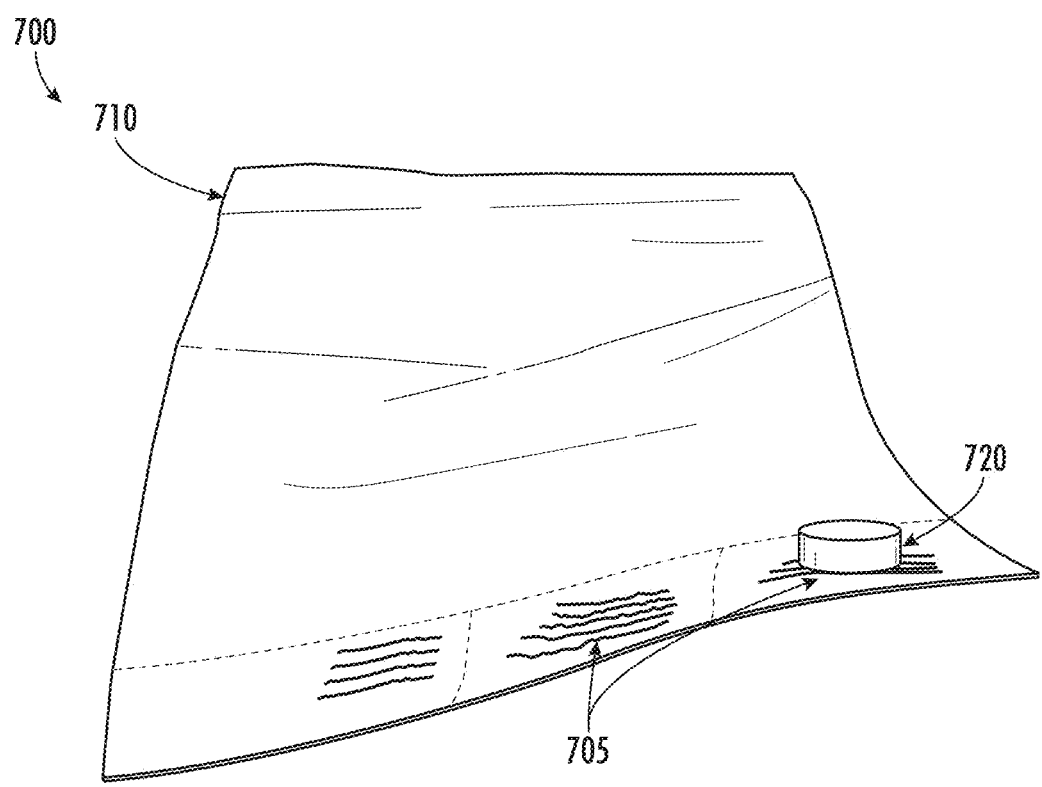
FIG. 7 illustrates functionality of metallic lines printed on the surface of a fabric, or within a composite, in accordance with one embodiment of the invention.
Figure 8:
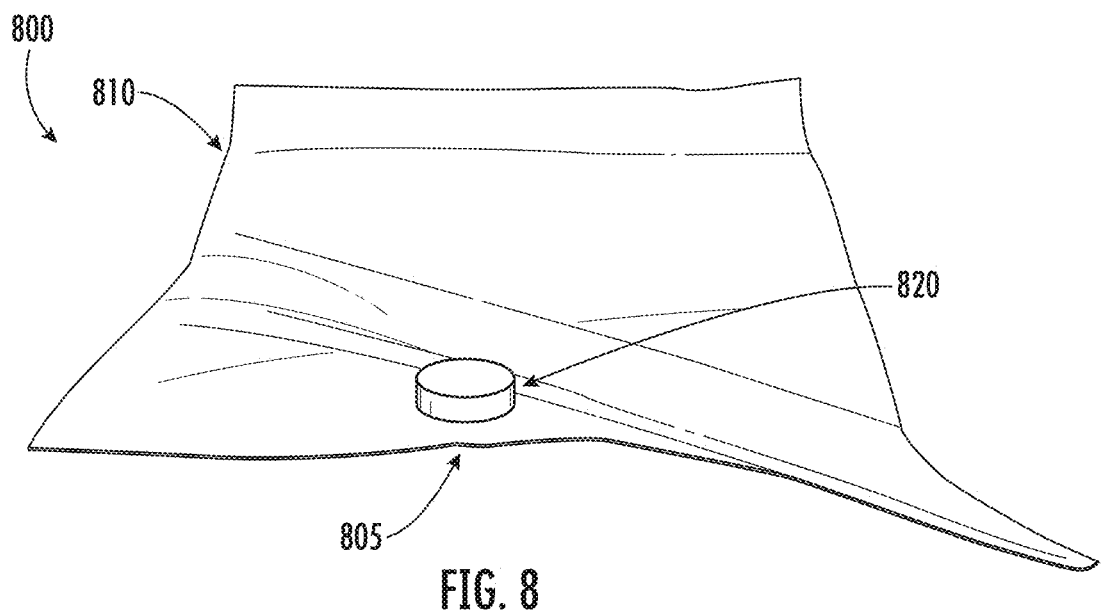
FIG. 8 illustrates functionality of metallic lines printed on the surface of a fabric, or within a composite, in accordance with one embodiment of the invention.

FIGS. 7 and 8 illustrate the functionality of the metallic lines printed on the surface of a fabric, or within a composite, in accordance with some embodiments of the invention. Specifically, FIG. 7 illustrates the magnetic attraction force between the metallic pattern 705 printed on a surface of a fabric 710, by use of a magnet 720. FIG. 8 illustrates the magnetic attraction force between the metallic pattern 805 (in between surfaces of the fabric 810, not visible) printed within layers of a composite fabric 810, by use of a magnet 820. As discussed, the patterns 705 and 805 may vary (e.g., any of lines, dots or other pattern elements may be employed). Typically, pattern elements are structured such that they are close enough together, i.e., with a predetermined optimal distance or spacing, to engage the magnets (720, 820) in the mold sufficiently to hold the fabric sheet in place.

In some embodiments, a spunbond composite fabric composed of one or multiple layers of polypropylene or polyester spunbond nonwoven is employed, as illustrated by FIGS. 6-8. In some embodiments, a spunlace polyester or polyester blend fabric composed of one or multiple layers is employed. In some embodiments, a needlepunched polyester or polypropylene nonwoven fabric is employed. In some embodiments, a composite fabric comprising any suitable combination of the above fabrics is employed (e.g., a composite fabric with layers of both spunbond and spunlace and/or needlepunch nonwoven fabrics). That said, any other suitable fabric may also be employed. Moreover, the printed metallic lines can be located on the surface of the fabric, or in between layers of a composite fabric.

In this solution, as reflected by the foregoing embodiments, proper alignment of the fabric sheet within the mold does not rely on the alignment of a pattern on the fabric, but instead is assisted by pins in the mold and corresponding locator holes in the fabric sheet. At least two pins must be used, but more can be used as needed.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation. In addition, where possible, any terms expressed in the singular form herein are meant to also include the plural form and/or vice versa. As used herein, "at least one" shall mean "one or more" and these phrases are intended to be interchangeable. Accordingly, the terms "a" and/or "an" shall mean "at least one" or "one or more," even though the phrase "one or more" or "at least one" is also used herein.

What is claimed:

1. A method for producing a foam part, comprising:
providing a mold for producing a foam part, the mold comprising a first mold half and a second mold half defining a volume therebetween, wherein the mold comprises a plurality of magnet elements spaced apart from each other in a first pattern and located adjacent to a surface of the first mold half;
providing a fabric sheet comprising a second pattern printed on a first surface of the fabric sheet, wherein the second pattern comprises a plurality of spaced apart metallic pattern elements having a respective distance between each spaced apart metallic pattern element thereby defining spaces on the first surface of the fabric sheet between adjacent spaced apart metallic pattern elements where no metallic pattern elements exist, wherein the plurality of spaced apart metallic pattern elements are in a distribution over the first surface of the fabric sheet with spacing therebetween to thereby provide coverage on the fabric sheet so as ensure coupling of at least one of the spaced apart metallic pattern elements with at least one of the plurality of the magnet elements of the first mold half independent of a location of each of the plurality of magnet elements in or on the first mold half and independent of placement of the fabric sheet on the mold, wherein the second pattern of spaced apart metallic pattern elements is not configured to match the first pattern of magnet elements in or on the first mold half, and wherein each of the spaced apart metallic pattern elements comprises a print paste and a metallic powder, and wherein the fabric sheet is structured to be positioned in the mold for producing the foam part such that at least one of the spaced apart metallic pattern elements of the second pattern of the fabric sheet can be operatively coupled with at least one magnet element of the plurality of magnet elements of the first mold half; and
affixing the fabric sheet in the mold, whereby at least one of the spaced apart pattern elements of the first pattern of the fabric sheet is coupled with at least one magnet element of the plurality of magnet elements of the first mold half of the mold.

2. The method of claim 1, wherein the fabric sheet further comprises a third pattern of spaced apart metallic pattern elements printed on a second surface of the fabric sheet, opposite the first surface.

3. The method of claim 2, wherein the fabric sheet is from a continuous roll of fabric that is cut to form the fabric sheet.

4. The method of claim 2, wherein the fabric sheet is formed of a non-woven material.

5. The method of claim 2, wherein each of the plurality of magnet elements is affixed to the surface of the first mold half and facing the second mold half.

6. The method of claim 1, wherein the predetermined distance between the spaced apart metallic pattern elements of the second pattern is a distance in the range of 5-15 mm apart.

* * * * *